(12) United States Patent
Yamada et al.

(10) Patent No.: US 6,738,125 B2
(45) Date of Patent: May 18, 2004

(54) LIQUID CRYSTAL DISPLAY APPARATUS AND METHOD FOR MANUFACTURING SAME

(75) Inventors: Naoshi Yamada, Taki-gun (JP);
Nobuhiro Waka, Matsusaka (JP);
Ichiro Nakamura, Matsusaka (JP);
Eiichiro Nishimura, Matsusaka (JP);
Kazushi Tsuji, Matsusaka (JP);
Kohichi Toriumi, Matsusaka (JP);
Chikanori Tsukamura, Taki-gun (JP);
Okifumi Nakagawa, Taki-gun (JP);
Takaharu Yamada, Taki-gun (JP);
Hiroyuki Araki, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 370 days.

(21) Appl. No.: 09/747,022

(22) Filed: Dec. 26, 2000

(65) Prior Publication Data

US 2001/0005257 A1 Jun. 28, 2001

(30) Foreign Application Priority Data

Dec. 27, 1999 (JP) .......................................... P11-370017
Mar. 3, 2000 (JP) ..................................... P2000-058521

(51) Int. Cl.⁷ ...................... G02F 1/1339; G02F 1/1333; G02F 1/13
(52) U.S. Cl. ...................... 349/156; 349/155; 349/158; 349/187
(58) Field of Search ................................ 349/155, 156, 349/157, 158, 110, 187

(56) References Cited

U.S. PATENT DOCUMENTS

| | | | |
|---|---|---|---|
| 6,055,030 A | | 4/2000 | Izumi .......................... 349/73 |
| 6,067,144 A | * | 5/2000 | Murouchi ................... 349/156 |
| 6,187,485 B1 | | 2/2001 | Matsushima et al. .......... 430/7 |
| 6,504,591 B1 | * | 1/2003 | Kondo et al. ................ 349/123 |
| 6,509,948 B2 | * | 1/2003 | Suzuki ........................ 349/155 |

FOREIGN PATENT DOCUMENTS

| | | |
|---|---|---|
| JP | 5-313175 A | 11/1993 |
| JP | 7-92477 A | 4/1995 |
| KR | 1998-080542 A | 11/1998 |
| WO | 99/00705 A1 | 1/1999 |

* cited by examiner

*Primary Examiner*—Dung Nguyen
(74) *Attorney, Agent, or Firm*—Nixon & Vanderhye P.C.

(57) ABSTRACT

It is an object of the invention to provide a liquid crystal display apparatus in which the cell gap is uniform and the display quality is high, and also a method for manufacturing the same. In the liquid crystal display apparatus, a color filter side substrate in which a protrusion is formed by a black mask, and a TFT side substrate in which a recess is formed by a resin film such as an orientation film are bonded together via dispersed spacers therebetween, and a liquid crystal is filled between the substrates. In the resin film such as an orientation film, patterning is performed except a portion which is opposed to the protrusion, thereby forming the recess in the TFT side substrate. The formation of the recess prevents the cell gap from being pushed up even when the dispersed spacers are placed on the protrusion. Even in the case where the substrates are not flat, therefore, the cell gap can be maintained uniform.

12 Claims, 5 Drawing Sheets

LIQUID CRYSTAL DISPLAY APPARATUS AND METHOD FOR MANUFACTURING SAME

BACKGROUND OF THE INVENTION

1. Field of the Invention

The present invention relates to a liquid crystal display apparatus, and also to a method for manufacturing the same.

2. Description of the Related Art

A liquid crystal display apparatus has a pair of substrates which are opposed to each other. A cell gap is maintained to a constant value by spacers, and a liquid crystal is filled between the substrates. FIG. 7 is a section view showing the configuration of a liquid crystal display apparatus 220 of the conventional art. The liquid crystal display apparatus 220 has a color filter side substrate 225 and a TFT (Thin Film Transistor) side substrate 226.

In the color filter side substrate 225, a color filter 202, black masks 204, an counter electrode which is not shown, and the like are arranged on a transparent substrate 208 which is made of glass or the like, and the surface is covered with an orientation film 215. In the TFT side substrate 226, liquid crystal driving elements such as TFT elements, wiring portions 203, an insulating film 207, pixel electrodes which are not shown, and the like are arranged on a transparent substrate 209, and the surface is covered with an orientation film 216.

The liquid crystal display apparatus 220 is produced in the following manner. For example, the color filter side substrate 225 and the TFT side substrate 226 are bonded together to form an empty cell, via dispersed spacers 201 for maintaining the cell gap, and a liquid crystal sealing material 214 into which a spacer 213 for maintaining the cell gap in the periphery of the liquid crystal display apparatus 220 is mixed. A liquid crystal 217 is filled into the empty cell. Then, the filling port is sealed by a sealing agent such as a resin.

The cell gap means the gap G between the color filter side substrate 225 and the TFT side substrate 226 in a pixel region where the pixel electrodes are opposed to the counter electrode, and is determined mainly depending on the diameters of the dispersed spacers 201, and the spacer 213 in the sealing material 214, and the filling and sealing conditions of the liquid crystal 217. The uniformity of the cell gap is closely related to the display quality of the liquid crystal display apparatus 220. When the uniformity of the cell gap is low, there arises problems such as that display unevenness such as brightness unevenness or color unevenness is caused in the display screen.

In a rectangular display region 240 of the liquid crystal display apparatus 220, a large number of pixels in which the respective pixel electrodes are opposed to the counter electrode, and the color filters 202 are formed correspondingly with the pixels. In the display region, in order to prevent light from leaking from adjacent pixels, the black mask 204 which surrounds the color filters 202 of the pixels is formed as required into a lattice-like shape extending over the whole of the display region 240. In a picture frame region 241 surrounding the display region, a frame-like black mask 210 is formed.

The black mask 204, 210 is made of a resin in the same manner as the color filters 202. In order to attain sufficient light shielding properties, therefore, the black masks must be formed so as to be thick. Consequently, a film thickness of the black mask 204, 210 is thicker than that of the color filters 202. As a result, protrusions 205 and 212 are formed in the surface of the orientation film 215 of the color filter side substrate 225.

In the liquid crystal display apparatus 220, the protrusions 205 and 212 are formed by the black masks 204 and 210 in the surface of the color filter side substrate 225 which faces the liquid crystal 217. For example, protrusions caused by the wiring portions 203, the liquid crystal driving elements, and the like may be sometimes formed in the surface of the TFT side substrate 226, so that convex and concave portions are formed in the surfaces of the substrates 225 and 226 which face the liquid crystal.

FIG. 7 shows a state in which a uniform cell gap is formed while the dispersed spacers 201 are not placed on the protrusions 205 and 212 formed by the black masks 204 and 210. However, the dispersed spacers 201 are indefinitely placed because the dispersed spacers are randomly dispersed on the color filter side substrate 225 or the TFT side substrate 226.

FIG. 8 is a section view schematically showing a state where a dispersed spacer 206 is placed on a protrusion 205 of the display region. Since the dispersed spacer 206 is placed on the protrusion 205 formed by the black mask 204 of the color filter side substrate 225, the cell gap which is defined by the dispersed spacer 206 placed on the protrusion 205 is larger than that which is defined by the other dispersed spacers 201 placed on the flat portion, by the dimension equal to the height of the protrusion 205. This difference in the substrate gap causes an uneven cell gap, whereby display unevenness such as brightness unevenness or color unevenness is caused in the display screen.

FIG. 9 is a section view schematically showing a state where a dispersed spacer 211 is placed on the protrusion 212 of the picture frame region 241. In the display region 240, most of area excluding the liquid crystal driving elements and the wiring portions 203 is formed by transparent thin films through which pixel electrode light can be transmitted. By contrast, in the picture frame region 241 surrounding the display region 240, the frame-like black mask 210 is formed in order to prevent light from leaking from the region. In this way, the display region 240 and the picture frame region 241 are different from each other in film structure.

The film thickness of the black mask 210 is thicker than that of the color filters 202. This causes a step to be formed between the display region 240 and the picture frame region 241, and the protrusion 212 to be formed on the face of the orientation film 215 of the color filter side substrate 225 in the picture frame region 241. Therefore, the cell gap which is defined by the dispersed spacers 211 placed on the protrusion 212 of the picture frame region is larger than that which is defined by the spacer 213 in the sealing material 214, and the dispersed spacers 211 push up the cell gap in the periphery of the display region. As a result, an uneven cell gap is formed, and display unevenness such as brightness unevenness or color unevenness is caused in the display screen in the vicinities of the dispersed spacers 211.

In some of conventional art techniques for spacers of a liquid crystal display apparatus, the cell gap in the peripheral portion is adjusted by changing the diameter of the spacer 213 in the sealing material 214. In the case where the dispersed spacers 211 are placed on the protrusion 212 due to, for example, the black mask 210 in the picture frame region 241, however, the dispersed spacers 211 affect the value of the cell gap more dominantly than the spacer 213 in the sealing material 214 as shown in FIG. 9. Even when the diameter of the spacer 213 in the sealing material 214 is changed, therefore, unevenness of the cell gap caused by the dispersed spacers 211 placed in the picture frame region 241 cannot be prevented.

By contrast, in another conventional art technique, it is intended to overcome the problem of an uneven cell gap by reducing the thickness of a film forming protrusions, such as a black mask. However, such a technique has a problem in that the thickness of a film forming protrusions cannot be reduced because of a technical reason such as a method for manufacturing the film forming protrusions, or a reason in display quality such as that sufficient light shielding properties cannot be obtained in the case of a reduced film thickness.

In a further conventional art technique, a method is employed in which a liquid acrylic resin or the like is applied to a substrate by the spin coating method, and the applied thin film is fired to overcoat protrusions, thereby enhancing the flatness of the substrate. However, the method of the conventional art technique has a problem in that an overcoating process must be additionally performed.

In a still further conventional art technique disclosed in Japanese Unexamined Patent Publication JP-A 7-92477 (1995), the difference between the cell gap of a portion where an ITO (Indium-Tin Oxide) film serving as a transparent electrode is formed, and that of a portion where the ITO film is not formed is eliminated by forming a dummy ITO film. In the method, however, the position where the ITO film can be formed, and the thickness of the ITO film are restricted, and hence unevenness of the cell gap caused by small protrusions which are formed by a black mask and the like cannot be improved.

SUMMARY OF THE INVENTION

It is an object of the invention to provide a liquid crystal display apparatus of high display quality having a uniform cell gap, and also a method for manufacturing the same.

The invention provides a method for manufacturing a liquid crystal display apparatus in which spacers and a liquid crystal are interposed between a pair of substrates, the method comprising the steps of:

forming a protrusion in a liquid-crystal-facing surface of one of the substrates; and forming a recess in a region of a liquid-crystal-facing surface of the other of the substrates, the region being opposed to the protrusion.

According to the invention, in the case where a protrusion is formed in the one substrate, a recess is formed in a region of the other substrate which region is opposed to the protrusion, whereby the cell gap is prevented from being pushed up by a spacer placed on the protrusion. Even when the substrates are not flat, the cell gap can be uniformalized. In the liquid crystal display apparatus, therefore, reduction of the display quality due to unevenness of the cell gap can be prevented, thereby improving the display quality.

When the recess is formed in a thin film constituting the other substrate, it is not required to add a process of forming an additional film on the surface of the other substrate, such as an overcoating process, and the manufacturing cost is not increased.

Even in the case where a film for forming the protrusion and another film which constitute the one substrate cannot be thinned because of a technical reason or a reason in display quality, the cell gap can be uniformalized by forming the recess in the other substrate.

Furthermore, in the invention it is preferable that the protrusion is a protrusion which is formed by a black mask.

According to the invention, the protrusion is formed in the one substrate by the black mask which is made thicker than a color filter in order to attain light shielding properties, and the recess is formed in the portion of the other substrate, opposed to the protrusion. Therefore, a spacer placed on the protrusion enters the recess, whereby the cell gap is prevented from being pushed up by the spacer. Accordingly, even when the substrates are not flat, the cell gap can be uniformalized.

The invention provides a method for manufacturing a liquid crystal display apparatus in which spacers and a liquid crystal are interposed between a pair of substrates, the method comprising the steps of:

forming a recess in a liquid-crystal-facing surface of one of the substrates; and forming a protrusion in a portion of a liquid-crystal-facing surface of the other of the substrates, the portion being opposed to the recess.

According to the invention, in the case where a recess is formed in the one substrate, a protrusion is formed in a liquid crystal layer side portion of the other substrate which opposes to the recess, whereby the cell gap can be uniformalized. In the liquid crystal display apparatus, therefore, reduction of the display quality due to unevenness of the cell gap can be prevented, thereby improving the display quality.

When the protrusion is formed in a thin film constituting the other substrate, it is not required to add a process of forming an additional film on the liquid-crystal-facing surface of the substrate, such as an overcoating process, and the production cost is not increased.

The invention provides a method for manufacturing a liquid crystal display apparatus in which spacers and a liquid crystal are interposed between a pair of substrates, the method comprising the steps of:

forming a recess in a liquid-crystal-facing surface of one of the substrates; and filling the recess.

According to the invention, in the case where a recess is formed in the one substrate, the liquid-crystal-facing surface of the one substrate is adjusted and flattened so as to fill the recess, whereby the cell gap can be uniformalized. In the liquid crystal display apparatus, therefore, reduction of the display quality due to unevenness of the cell gap can be prevented from occurring, thereby improving the display quality.

When the recess is flattened by a thin film constituting the one substrate, it is not required to add a process of forming an additional film on the liquid-crystal-facing surface of the substrate, such as an overcoating process, and the production cost is not increased.

The invention provides a liquid crystal display apparatus comprising:

a pair of substrates;

spacers; and a liquid crystal, the spacers and liquid crystal being interposed between the pair of substrates, wherein a protrusion is formed in a liquid-crystal-facing surface of one of the substrates, and a recess is formed in a region of a liquid-crystal-facing surface of the other of the substrates, the region being opposed to the protrusion.

According to the invention, in the case where a protrusion is formed in the one substrate, a recess is formed in a region of the other substrate opposed to the protrusion, so that, even when the respective substrates are not flat, the cell gap can be uniformalized. In the liquid crystal display apparatus of the invention, therefore, display unevenness such as brightness unevenness or color unevenness can be prevented from occurring, thereby improving the display quality.

Furthermore, in the invention it is preferable that the protrusion is a protrusion which is formed by a black mask.

According to the invention, the protrusion is formed in the one substrate by the black mask which is made thicker than a color filter in order to attain light shielding properties, and the recess is formed in the portion of the other substrate opposed to the protrusion. Therefore, a spacer placed on the protrusion enters the recess, whereby the cell gap is prevented from being pushed up by the spacer. Accordingly, even when the substrates are not flat, the cell gap can be uniformalized.

The invention provides a liquid crystal display apparatus comprising a pair of substrates; spacers; and a liquid crystal, the spacers and liquid crystal being interposed between the pair of substrates, wherein a recess is formed in a liquid-crystal-facing surface of one of the substrates, and the recess is filled.

According to the invention, in the case where a recess is formed in the one substrate, the liquid-crystal-facing surface of the one substrate is adjusted and flattened so as to fill the recess, whereby the cell gap can be uniformalized. In the liquid crystal display apparatus, therefore, reduction of the display quality due to unevenness of the cell gap can be prevented from occurring, thereby improving the display quality.

The invention provides a liquid crystal display apparatus comprising: a pair of substrates; spacers; and a liquid crystal, the spacers and liquid crystal being interposed between the pair of substrates, wherein a protrusion having a height H and a width W1 is formed in a liquid-crystal-layer-facing surface of one of the substrates, a recess having a depth D and a width W2 is formed in a region of a liquid-crystal-layer-facing surface of the other of the substrates, the region being opposed to the protrusion, and in the case where the height H of the protrusion is smaller than the depth D of the recess, the width W1 of the protrusion and the width W2 of the recess are selected so that the width W1 is larger than the width W2 of the recess.

According to the invention, in a liquid crystal display apparatus, the one and other substrates are separated from each other by a predetermined gap by the spacers, and bonded together so as to be opposed to each other via the liquid crystal. In this configuration, the protrusion formed in the liquid-crystal-facing surface of the one substrate, and the recess formed in the liquid-crystal-facing surface of the other substrate are placed so as to be opposed to each other. For example, the protrusion is a black mask, and the recess is a contact hole which is formed in an insulating layer by a photolithography technique or the like. In the liquid crystal display apparatus of the invention, the protrusion and the recess are set so that, when the height H of the protrusion is smaller than the depth D of the recess, the width W1 of the protrusion is set to be larger than the width W2 of the recess, whereby the cell gap can be uniformalized. Namely, in the case where several spacers are placed on the protrusion, the width W1 of the protrusion is made larger than the width W2 of the recess, thereby causing spacers on the protrusion to exist in the recess and a region other than the recess. Among spacers placed on the protrusion, spacers existing in the recess do not have a function of restricting the cell gap, but those existing in the region other than the recess restrict the cell gap. Therefore, the effect of pushing up spacers is attained by the protrusion, and the cell gap is prevented from being excessively thinned by the recess. In the liquid-crystal display apparatus, consequently, brightness unevenness is prevented from occurring.

Furthermore, in the invention it is preferable that the protrusion is a protrusion which is formed by a black mask.

According to the invention, the protrusion is formed in the one substrate by the black mask which is made thicker than a color filter in order to attain light shielding properties, and the recess is formed in the portion of the other substrate opposed to the protrusion. Therefore, a spacer placed on the protrusion enters the recess, whereby the cell gap is prevented from being pushed up by the spacer. Even when the substrates are not flat, the cell gap can be uniformalized.

Furthermore, in the invention it is preferable that the protrusion and recess are formed in a picture frame region in a periphery of a display region of the liquid crystal display apparatus.

According to the invention, when the film thickness of a black mask placed in a picture frame region in a periphery of a display region is larger than that of a color filter placed in the display region, for example, the flatness of the liquid-crystal-facing surface of the one substrate is lowered. In the picture frame region also, the relationships between the protrusion and the recess are selected as described above, whereby the cell gap is prevented from being excessively thinned by the recess, so that the cell gap can be uniformalized. In the liquid crystal display apparatus, consequently, brightness unevenness can be prevented.

Furthermore, in the invention it is preferable that the protrusion and recess are formed in a region in a picture frame region and separated from a display region.

According to the invention, the protrusion and recess are formed in a region in a picture frame region and separated from the display region, i.e., in the vicinity of a liquid crystal sealing material. Among spacers placed on the protrusion, spacers existing in the recess in the vicinity of the sealing material do not have a function of restricting the cell gap, but those existing in the region other than the recess and separated from the sealing material restrict the cell gap. Therefore, the cell gap is prevented from being excessively thinned by the recess, so that the cell gap can be uniformalized. In the liquid crystal display apparatus, consequently, brightness unevenness can be prevented.

Furthermore, in the invention it is preferable that the protrusion and recess are formed in a region in a picture frame region and in close proximity to a display region.

According to the invention, the protrusion and recess are formed in a region in a picture frame region and in close proximity to the display region. Among spacers placed on the protrusion, spacers existing in the recess in the vicinity of the display region do not have a function of restricting the cell gap, but those existing in the region other than the recess and separated from the display region restrict the cell gap. Therefore, the cell gap is prevented from being excessively thinned by the recess, so that the cell gap can be uniformalized. In the liquid crystal display apparatus, consequently, brightness unevenness can be prevented.

Furthermore, in the invention it is preferable that a second recess is further formed in a periphery of the recess of the other substrate.

According to the invention, the second recess is disposed in a periphery of the recess which is, for example, a contact hole. In a portion of a contact hole serving as the recess, no restriction due to spacers is imposed on the cell gap, and hence the uniformity of the cell gap is locally lowered so as to produce display unevenness. By contrast, in the invention, the other recess is disposed in a periphery of a contact hole serving as the recess, and the uniformity of the cell gap can be therefore prevented from being locally lowered, whereby brightness unevenness can be prevented.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
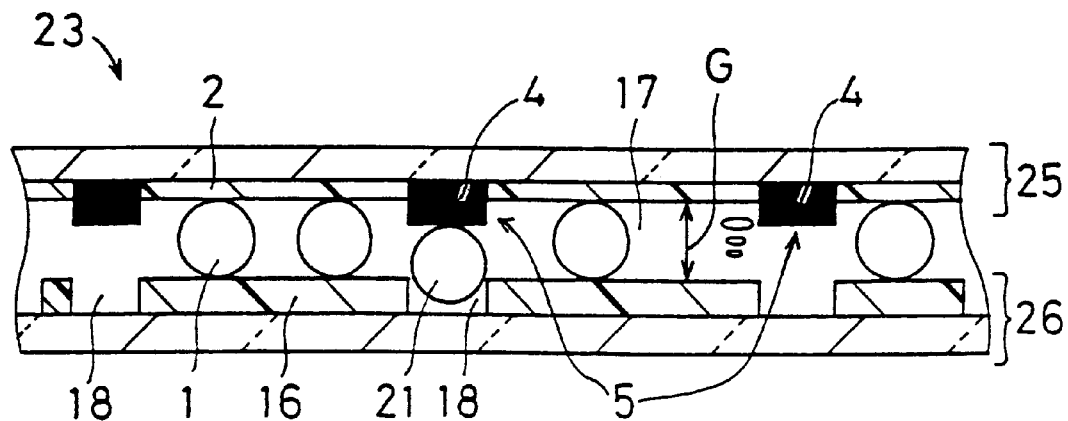
FIG. 1 is a schematic section view showing the configuration of a display region of a liquid crystal display apparatus 23 of an embodiment of the invention.

Now referring to the drawings, preferred embodiments of the invention are described below.

A liquid crystal display apparatus has a pair of substrates which are opposed to each other. A cell gap is maintained to a constant value by spacers, and a liquid crystal is sealed between the substrates.

One of the substrates is a color filter side substrate in which color filters, a black mask, an counter electrode, and the like are arranged on a light transmitting substrate which is made of glass or the like, and the surface is covered with an orientation film. The other substrate is a TFT side substrate in which liquid crystal driving elements such as TFT elements, wiring portions, an insulating film, pixel electrodes, and the like are arranged on a light transmitting substrate, and the surface is covered with an orientation film.

Most of liquid crystal display apparatuses are produced in the following manner. A color filter side substrate and a TFT side substrate are bonded together to form an empty cell, via spacers for maintaining the cell gap, and a liquid crystal sealing material into which a spacer for defining the cell gap in the periphery of the display region is mixed. A liquid crystal is filled into the empty cell. Then, the filling port is sealed by a sealing agent such as a resin and the like.

The cell gap means the distance between the color filter side substrate and the TFT side substrate in a pixel region where the pixel electrodes are opposed to the counter electrode, and is determined mainly depending on the diameters of the dispersed spacers, and the spacer in the sealing material, and the filling and sealing conditions of the liquid crystal. The uniformity of the cell gap is closely related to the display quality of the liquid crystal display apparatus. When the uniformity of the cell gap is low, display unevenness such as brightness unevenness or color unevenness is caused in the display screen.

FIG. 1 is a schematic section view showing the configuration of a display region of a liquid crystal display apparatus 23 of an embodiment of the invention. The liquid crystal display apparatus 23 has a color filter side substrate 25 and a TFT side substrate 26.

In the color filter side substrate 25, color filters 2, a black mask 4, an counter electrode which is not shown, and the like are arranged on a light transmitting substrate which is made of glass or the like, and the surface is covered with an orientation film which is not shown. In the TFT side substrate 26, liquid crystal driving elements such as TFT elements, wiring portions, an insulating film, pixel electrodes which are not shown, and the like are arranged on a light transmitting substrate, and the surface is covered with a resin film 16 such as an orientation film (hereinafter, the resin film is referred to as orientation film).

The region of the liquid crystal display apparatus 23 where the counter electrode is opposed to the pixel electrodes is a pixel region which directly relates to the display. In a rectangular display region, a large number of pixels are arranged vertically and laterally, and the color filters 2 are disposed correspondingly with the respective pixels. In the display region 50, in order to prevent light from leaking into adjacent respective pixels, the black mask 4 which surrounds the color filters 2 of the respective pixels is formed as required into a lattice-like shape extending over the whole of the display region 50 of the color filter side substrate 25.

The black mask 4 is made of a resin in the same manner as the color filters 2. In order to attain sufficient light shielding properties, therefore, the film thickness of the black mask must be formed so as to be thick. Consequently, the film thickness of the black mask 4 is thicker than that of the adjacent color filters 2. As a result, protrusions 5 are formed in the surface of the color filter side substrate 25 which faces the liquid crystal 17.

In the liquid crystal display apparatus 23, the protrusions 5 caused by the black mask 4 are formed in the surface of the color filter side substrate 25. In addition, protrusions caused by the wiring portions and the liquid crystal driving elements may be sometimes formed in the surface of the TFT side substrate 26.

In the liquid crystal display apparatus 23, the orientation film 16 is formed in the TFT side substrate 26 except portions which are opposed to the protrusions 5 of the color filter side substrate 25. As a result, recesses 18 are formed in the surface of the TFT side substrate 26 which faces the liquid crystal 17. With respect to each of the recesses 18, a gap between the substrates 25 and 26 is formed so as to be equal to or larger than the substrate gap G which is the cell gap in a region where the protrusions 5 do not exist.

Figure 8:
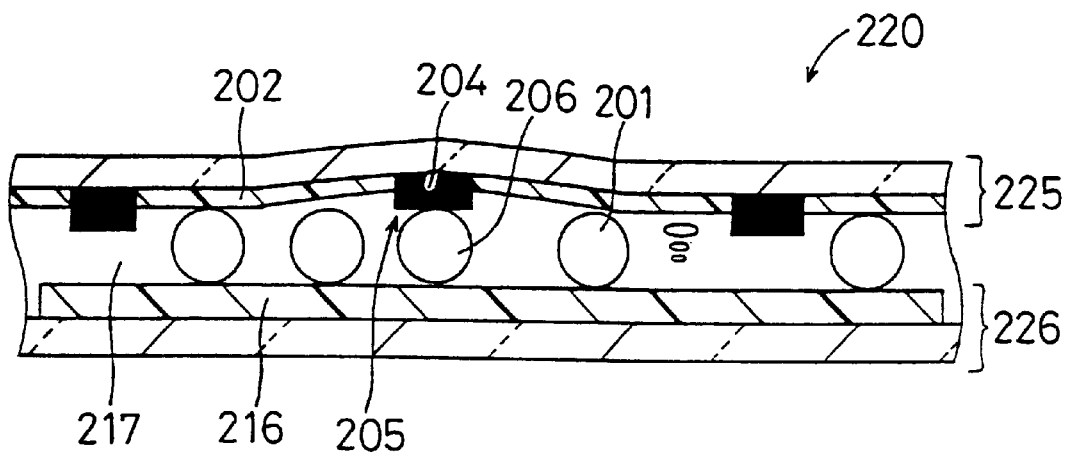
FIG. 8 is a section view schematically showing a state where dispersed spacers 206 are placed on a protrusion 205 of a display region 240.

Dispersed spacers 1 are randomly dispersed on the surface of the orientation film of the color filter side substrate 25 or the orientation film 16 of the TFT side substrate 26. In the liquid crystal display apparatus 220 of the conventional art in which the substrates 225 and 226 are bonded together to form a cell as shown in FIG. 8, when the dispersed spacer 206 is placed on the protrusion 205, the dispersed spacer 206 on the protrusion 205 functions as a support to increase the cell gap in the periphery of the protrusion, thereby causing display unevenness.

By contrast, in the liquid crystal display apparatus 23, the recess 18 is formed in the portion of the TFT side substrate 26 which opposes the protrusion 5, and a dispersed spacer 21 placed on the protrusion 5 therefore enters the recess 18 formed in the TFT side substrate 26, whereby the cell gap can be prevented from being pushed up by the dispersed spacer 21. Therefore, the cell gap in the portion where the protrusion 5 and the recess 18 are formed is defined by the other dispersed spacers 1 which are placed in the vicinity of the portion, and hence the cell gap of the liquid crystal display apparatus 23 is uniformalized. In the liquid crystal display apparatus 23, the cell gap is uniformalized even when the substrates 25 and 26 are not flat. Unlike the conventional art in which the surface of a substrate on which protrusions are formed is flattened by an overcoat film, therefore, it is not required to add an overcoating process, and the production cost can be prevented from being increased.

Next, an example of a method of forming the orientation film 16 will be described. Onto the surface of the substrate in which the wiring portions, the liquid crystal driving elements, the insulating film, the pixel electrodes, and like are arranged on a light transmitting substrate, a liquid material which will serve as the orientation film 16 is applied by the spin coating technique or the like, and then dried to form a polyimide thin film. A resist resin which is an ultraviolet curable resin is applied to the surface of the film to form a resist coating film.

Thereafter, a mask plate in which a predetermined mask pattern is formed is placed on the resist coating film with being positioned so as to shield the portion where the recess 18 is to be formed, from light. Next, an exposure process is performed by irradiating the resist coating film with ultraviolet rays from a position above the mask plate. The resist coating film in which portions for covering the surfaces of the polyimide film serving as the orientation film 16 are cured by the exposure is developed, and the resist in the portion where the recess 18 is to be formed is removed away.

The portion of the polyimide film in which the resist pattern is formed and in which the recess 18 is to be formed is removed away by etching, and the resist coating film is then removed away. The thus patterned polyimide film is subjected to a rubbing process in which the surface is rubbed with cloth or the like, whereby the patterned orientation film 16 is formed.

In place of the orientation film 16, a film which does not adversely affect the liquid crystal display, such as a coating film made of an acrylic resin constituting the TFT side substrate 26, or an inorganic insulative coating film made of water glass may be selected as a film for forming the recess 18. When the film for forming the recess 18 can be patterned by a photo process in which exposure and development is performed, for example, the recess 18 can be formed by changing the shape of the mask pattern of the mask plate. As a method of forming these films, the printing method may be employed in place of the above-mentioned photolithography technique.

Figure 2:
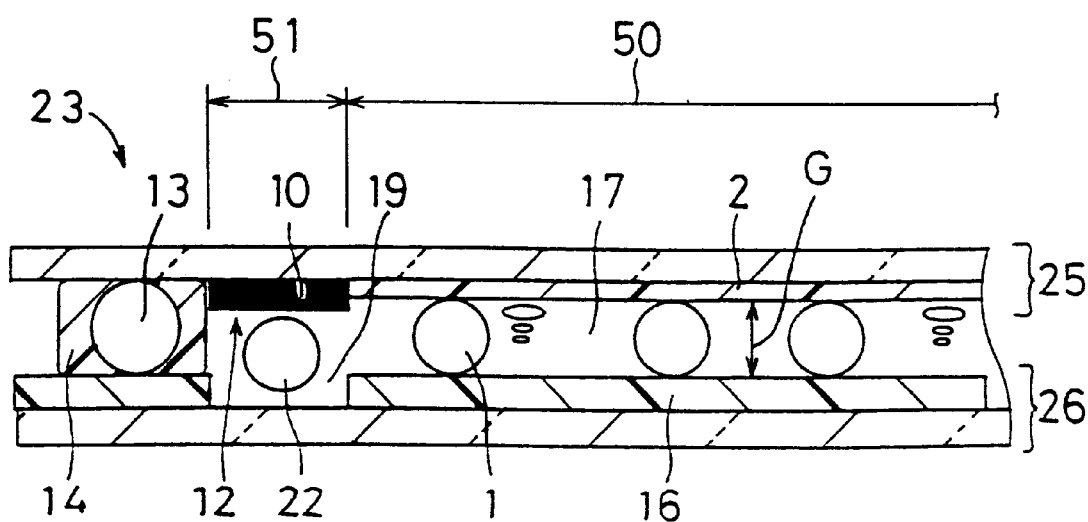
FIG. 2 is a schematic section view showing the configuration of a picture frame region of the liquid crystal display apparatus 23 of an embodiment of the invention.

FIG. 2 is a schematic section view showing the configuration of a picture frame region 51 of the liquid crystal display apparatus 23 of the embodiment of the invention. In the picture frame region 51 surrounding the display region 50 of the liquid crystal display apparatus 23, a frame-like black mask 10 which is thicker than the color filters 2 in thickness is formed in order to prevent light from leaking from the region. Therefore, a protrusion 12 is formed in the surface of the picture frame region 51 of the color filter side substrate 25 which faces the liquid crystal 17. A recess 19 is formed by the orientation film 16 in the surface of the TFT side substrate 26 which faces the liquid-crystal 17. With respect to the recess 19, a gap between the substrates 25 and 26 is formed so as to be equal to or larger than the substrate gap G which is the cell gap in a region where the protrusions 5 do not exist.

Figure 9:
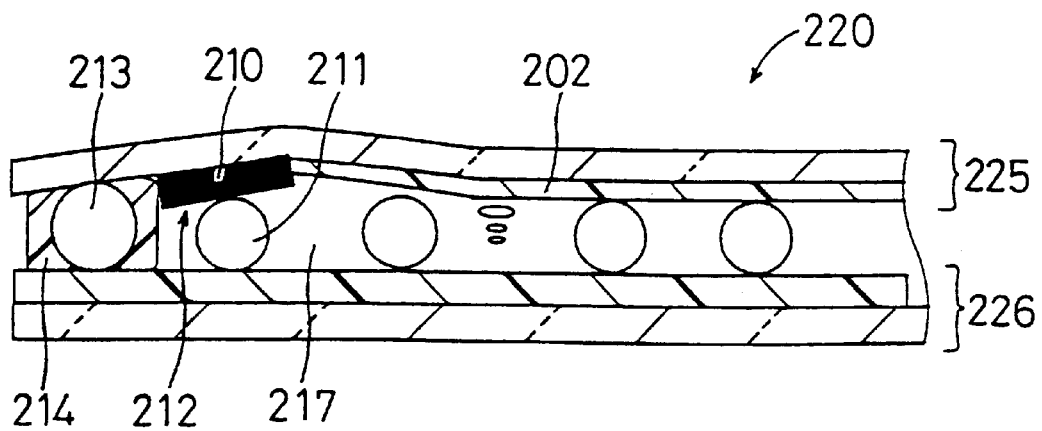
FIG. 9 is a section view schematically showing a state where a dispersed spacer 211 is placed on a protrusion 212 of a picture frame region 241.

In the liquid crystal display apparatus 220 of the conventional art, as shown in FIG. 9, when the dispersed spacer 211 is placed on the black mask 210 in the picture frame region 241, the cell gap is pushed up by the dispersed spacer 211 because the black mask 210 is thick, in the same manner as the case shown in FIG. 8 where the dispersed spacer 206 is placed on the black mask 204 in the display region 240.

The peripheral cell gap in a liquid crystal display apparatus is optimized mainly by a spacer in a sealing material. In the case where the dispersed spacers 211 are placed on the protrusion 212 as shown in FIG. 9, however, the dispersed spacers 211 affect the value of the cell gap more dominantly than the spacer 213 in the sealing material 214. Therefore, the cell gap of the picture frame region 241 is pushed up by the dispersed spacers 211, so that the cell gap in the vicinity of the picture frame region 241 is increased. In the liquid crystal display apparatus 220 of the conventional art, therefore, the dispersed spacers 211 affect also the display region 240 in the vicinity of the picture frame region 241, and display unevenness is caused in the vicinity of the display region.

By contrast, in the case where the recess 19 is formed in the portion of the TFT side substrate 26 which is opposed to the protrusion 12 as in the liquid crystal display apparatus 23 shown in FIG. 2, even when a dispersed spacer 22 is placed on the protrusion 12, the dispersed spacer 22 enters the recess 19, and hence the cell gap is not pushed up by the dispersed spacer 22. Therefore, the peripheral cell gap is defined by the diameter of a spacer 13 in a sealing material 14. As a result, the cell gap can be uniformalized by optimizing the diameter of the spacer 13.

The recess 19 is formed by the patterned orientation film 16, and the orientation film 16 is patterned by the above-mentioned photolithography technique.

In place of the orientation film 16, a film which does not adversely affect the liquid crystal display, such as a coating film made of an acrylic resin constituting the TFT side substrate 26, or an inorganic insulative coating film made of water glass may be selected as a film for forming the recess 19. When the film for forming the recess 19 is patterned by a photo process in which exposure and development is performed, for example, the recess 19 can be formed by changing the shape of the mask pattern of the mask plate. As a method of forming these films, the printing method may be employed in place of the above-mentioned photolithography technique.

As described above, in the liquid crystal display apparatus 23, even in the case where the film thickness of the black mask 4, 10 cannot be thinned because of a reason in display quality, the cell gap can be uniformalized by forming the recesses 18 and 19 in the surface of the opposing TFT side substrate 26 which faces the liquid crystal 17, even when the substrates 25 and 26 are not flat. In this way, in the liquid crystal display apparatus 23, even when the thickness of a film forming the protrusions 5 and 12 cannot be reduced because of a technical reason such as a method for manufacturing the film, or a reason in display quality such as that sufficient light shielding properties cannot be obtained in the case of a reduced film thickness, the cell gap can be uniformalized by adjusting the surface of the substrate 26 which is opposed to the protrusions 5 and 12 and faces the liquid crystal 17.

In each of substrates of a liquid crystal display apparatus, recesses may be sometimes formed in addition to such protrusions. The cell gap may be partly reduced by the recesses formed in the substrates, and the cell gap may be unevenly formed.

When a black mask is made of a metal in place of a resin, the film thickness of the metal-made black mask is smaller than that of a color filter because a metal material can attain sufficient light shielding properties even at a reduced thickness. In such a configuration, recesses are formed in a color filter side substrate.

When the width or depth of a recess of a color filter side substrate is large, or when dispersed spacers are not placed in the vicinity of a recess, the cell gap may be partly reduced, and the cell gap may be unevenly formed. In order to prevent such a phenomenon from occurring, a film may be formed in the color filter side substrate so as to fill a recess formed in the color filter side substrate, thereby uniformalizing the cell gap.

As a method of forming a film in a recess, a method may be employed in which a resin film is newly formed and patterning is then performed by a photolithography technique. However, this method causes the number of steps to be increased. Alternatively, a color filter film which is originally unnecessary in a light shielding region may be formed on a black mask with changing an exposure mask pattern or the like in steps of forming a color filter. In the alternative, the cell gap can be uniformalized without adding a new process.

As described above, ununiformity of the cell gap caused by a recess formed by a black mask which is thinner than a color filter in thickness can be improved by overlaying the color filter on the black mask. The invention is not restricted to this. For example, even in the case where a part of the cell gap is excessively thinned by a recess in the other substrate which is formed in order to improve ununiformity of the cell gap caused by a protrusion formed in the one substrate, the cell gap can be uniformalized by forming a film on the one substrate so as to fill the recess in the same manner as the method described above. In the case where a recess is formed in a substrate, the cell gap can be uniformalized by forming a protrusion in a portion of the opposed substrate which is opposed to the recess.

Figure 3:
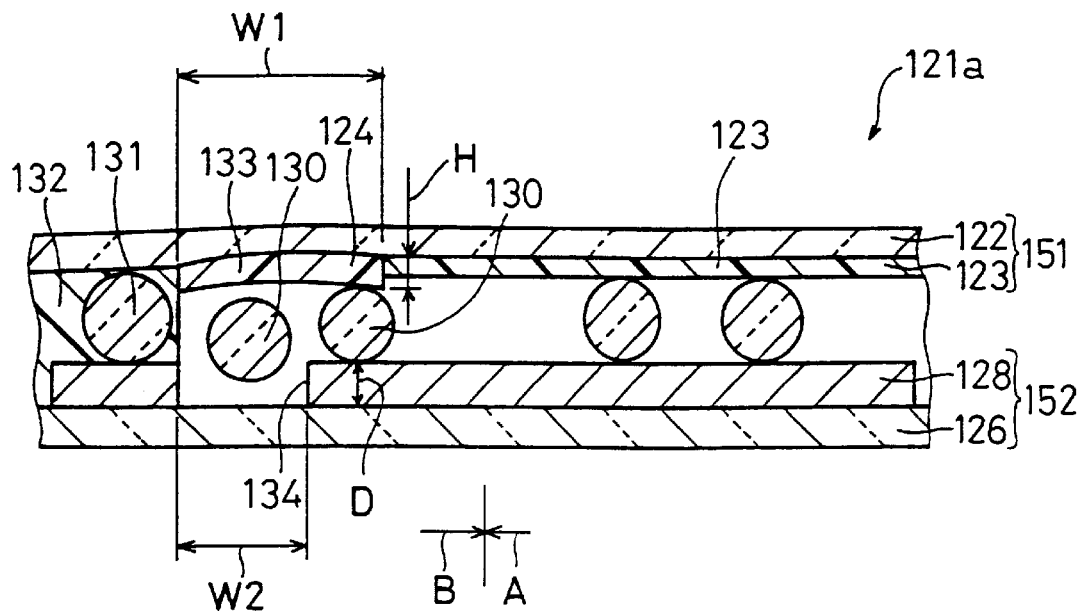
FIG. 3 is a section view of a liquid crystal display apparatus 121a of another embodiment of the invention.

FIG. 3 is a section view of a liquid crystal display apparatus 121a of a further embodiment of the invention. The liquid crystal display apparatus 121a comprises a color filter side substrate 151, a TFT side substrate 152, spacers 130 and 131, and a liquid crystal sealing material 132. A color filter 123 and a black mask 124 are formed on one surface of a transparent substrate 122 which is realized by a glass substrate or the like. These components may be covered with an orientation film as shown in FIG. 8. In this way, the color filter side substrate 151 is configured. An insulating layer 128 is formed on one surface of a transparent substrate 126 which is realized by a glass substrate or the like. Wiring portions, and pixel electrodes and TFT elements serving as liquid crystal driving elements such as shown in FIG. 8 are formed on the one surface of the transparent substrate 126, and an insulating layer 18 maybe further formed. These components maybe covered with an orientation film as shown in FIG. 8. In this way, the TFT side substrate 152 is configured.

Spacers 130 for maintaining uniformly the cell gap are dispersed on the substrates 151 and 152. End portions of a picture frame region B which is in the periphery of a display region A of the substrates 151 and 152 are bonded together by a liquid crystal sealing material 132 to form a cell. A liquid crystal is filled into the cell, and the liquid crystal filling port is then sealed by a resin, thereby configuring the liquid crystal display apparatus 121a. A spacer 131 for determining the cell gap is mixed into the liquid crystal sealing material 132. It is assumed that the spacers 130 and 131 are made of a plastic material.

In the liquid crystal display apparatus 121a, usually, most of the display region A is configured by pixel electrodes having light transmitting properties, other than the wiring portions and the TFT elements. By contrast, the picture frame region B which is in the periphery of the display region A is configured by the black mask 124 having light shielding properties, whereby light is prevented from leaking. In the picture frame region B, a protrusion 133 is formed by the black mask 124. As described above, the display region A and the picture frame region B are different in structure from each other, and also in thickness. Therefore, a step is formed in the vicinity of the regions A and B, and the uniformity of the cell gap is extremely lowered.

In the liquid crystal display apparatus 121a, in order to prevent such a step from being formed, a recess 134 is disposed in correspondence with the protrusion 133. For example, the recess 134 is a contact hole which is formed in the insulating layer 128 by a photolithography technique or the like. Alternatively, a film which does not adversely affect the display, such as an orientation film made of polyimide or the like, a coating film made of an acrylic resin, an organic resin or the like, or an inorganic insulative coating film made of water glass or the like may be selected, and the recess may be formed by, for example, a photolithography technique or an offset printing technique.

Specifically, the protrusion 133 is formed in the surface of the color filter side substrate 151 on the side of the liquid crystal, and has a height H and a width W1. The recess 134 is formed in the surface of the TFT side substrate 152 on the side of the liquid crystal so as to be opposed to the protrusion 133, and has a depth D and a width W2. Particularly, the liquid crystal display apparatus 121a of in the invention it is preferable that, when the height H of the protrusion 133 is smaller than the depth D of the recess 134, the width W1 of the protrusion 133 is selected to be larger than the width W2 of the recess 134. In other words, when the height H of the protrusion 133 is smaller than the depth D of the recess 134, the area of the protrusion 133 is selected to be larger than that of the recess 134. According to this configuration, among spacers 130 placed on the protrusion 133, spacers existing in the region other than the recess 134 restrict the cell gap. Therefore, the effect of pushing up the spacers 130 by the protrusion 133 is attained, and the cell gap is prevented from being excessively thinned. In the liquid crystal display apparatus 121a, consequently, brightness unevenness is prevented from occurring.

Such a protrusion 133 and a recess 134 may be disposed not only in the display region A but also in the picture frame region B. When the black mask 124 placed in the picture frame region B is thicker in thickness than the color filter 123 placed in the display region A, the spacers 130 placed in the picture frame region B function as the fulcrum to increase the step difference in the vicinity of the boundary between the display region A and the picture frame region B, so that the uniformity is lowered. At this time, by disposing the recess 134 corresponding to the protrusion 133 is disposed, the protrusion and the recess cancel each other.

In the case where the protrusion 133, i.e., the black mask 124 has a large area, when the recess 134 of the depth D which is larger than the height H of the protrusion 133 is formed, the cell gap is excessively thinned. In the invention, the protrusion 133 and the recess 134 are disposed in the above-mentioned relationships. In this case, when several spacers 130 are placed on the protrusion 133, the spacers 130 on the protrusion 133 exist in the recess 134 and a region other than the recess. Among the spacers 130 placed on the protrusion 133, spacers 130 existing in the recess 134 do not restrict the cell gap, but spacers 130 existing in the region other than the recess 134 restrict the cell gap. Therefore, the effect of pushing up the spacers 130 by the protrusion 133 is attained, and the cell gap is prevented from being excessively thinned. In the liquid crystal display apparatus 121a, consequently, brightness unevenness is prevented from occurring.

As shown in FIG. 3, particularly, the protrusion 133 and the recess 134 are formed in a region in the picture frame region B and separated from the display region A, i.e., in the vicinity of the liquid crystal sealing material 132. In this case, among the spacers 130 placed on the protrusion 133, spacers 130 existing in the recess 134 in the vicinity of the sealing material 132 do not restrict the cell gap, but spacers 130 existing in the region other than the recess 134 and separated from the sealing material 132 restrict the cell gap. Therefore, the cell gap is prevented from being excessively thinned by the recess 134, so that the cell gap can be uniformalized. In the liquid crystal display apparatus 121a, consequently, brightness unevenness can be prevented from occurring.

In this case, the cell gap can be made smaller than that in the liquid crystal display apparatus 220 of the conventional art shown in FIG. 9.

Figure 4:
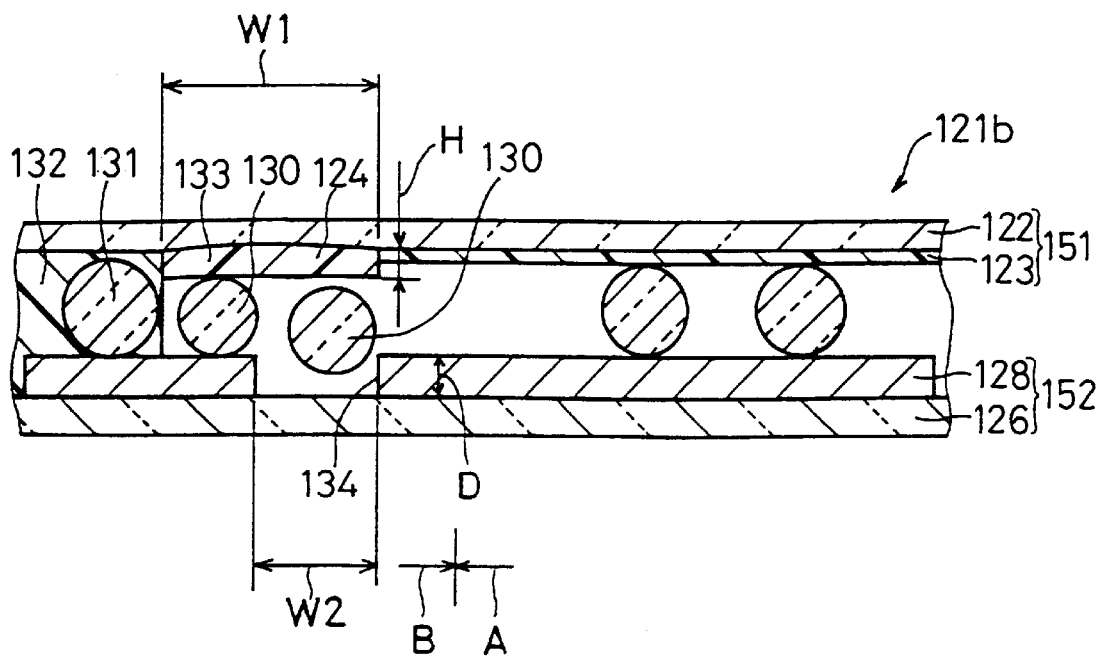
FIG. 4 is a section view of a liquid crystal display apparatus 121b of a further embodiment of the invention.

FIG. 4 is a section view of a liquid crystal display apparatus 121b of a still further embodiment of the invention. The liquid crystal display apparatus 121b is configured in the same manner as the liquid crystal display apparatus 121a except that the formation positions of the protrusion 133 and the recess 134 are different from those in the above embodiment. The identical components are denoted by the same reference numerals, and their description is omitted.

In particular, as shown in FIG. 4, the protrusion 133 and the recess 134 are formed in a region in the picture frame region B and in close proximity to the display region A. In this case, among the spacers 130 placed on the protrusion 133, spacers 130 existing in the recess 134 in the vicinity of the display region A do not restrict the cell gap, but spacers 130 existing in the region other than the recess 134 and separated from the display region A restrict the cell gap. Therefore, the cell gap is prevented from being excessively thinned, so that the cell gap can be uniformalized. In the liquid crystal display apparatus 121b, consequently, brightness unevenness can be prevented from occurring.

In this case, the cell gap can be made smaller than that in the liquid crystal display apparatus 220 of the conventional art shown in FIG. 9.

Furthermore, the spacers 130 which restrict the cell gap exist in a region which is outside and further separated from the display region A as compared with the case of the spacers 130 shown in FIG. 3, and hence exerts less influence on the display region A. Assuming that the width of the recess 134 is identical in both liquid crystal display apparatuses 121a and 121b, the cell gap in the liquid crystal display apparatus 121b can be made smaller than that in the liquid crystal display apparatus 121a of FIG. 3.

Figure 5:
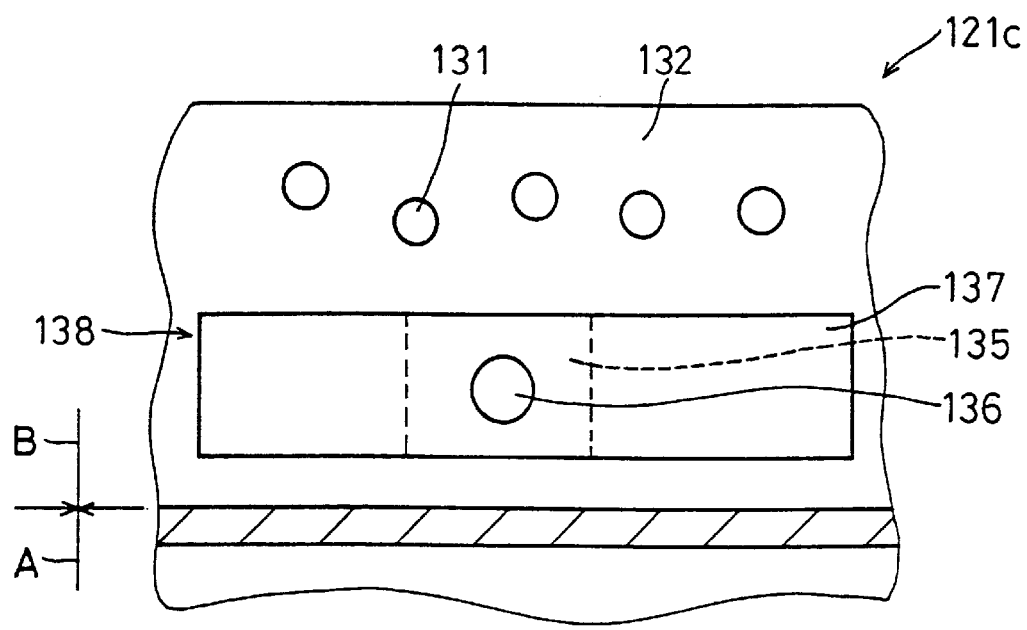
FIG. 5 is a plan view of a liquid crystal display apparatus 121c having a second recess 137 of a still further embodiment of the invention.

FIG. 5 is a plan view of a liquid crystal display apparatus 121c of a still further embodiment of the invention. The liquid crystal display apparatus 121c is configured in the same manner as the liquid crystal display apparatus 121a or 121b except that a contact hole 135 serving as a recess is formed in the picture frame region B and a second recess 137 is formed in the periphery of the contact hole. The identical components are denoted by the same reference numerals, and their description is omitted.

Usually, a common transfer portion 138 for transferring the common electrode of the color filter side substrate 151 to the TFT side substrate 152 is formed in the picture frame region B of the liquid crystal display apparatus 121c. In the common transfer portion 138, the contact hole 135 serving as a recess is formed in the insulating layer 128 of the TFT side substrate 152, and a transferring agent 136 which is realized by carbon or the like is placed in the contact hole 135. In the liquid crystal display apparatus 121c, the second recess 137 is formed in the periphery of the contact hole 135 of the TFT side substrate 152.

Figure 6:
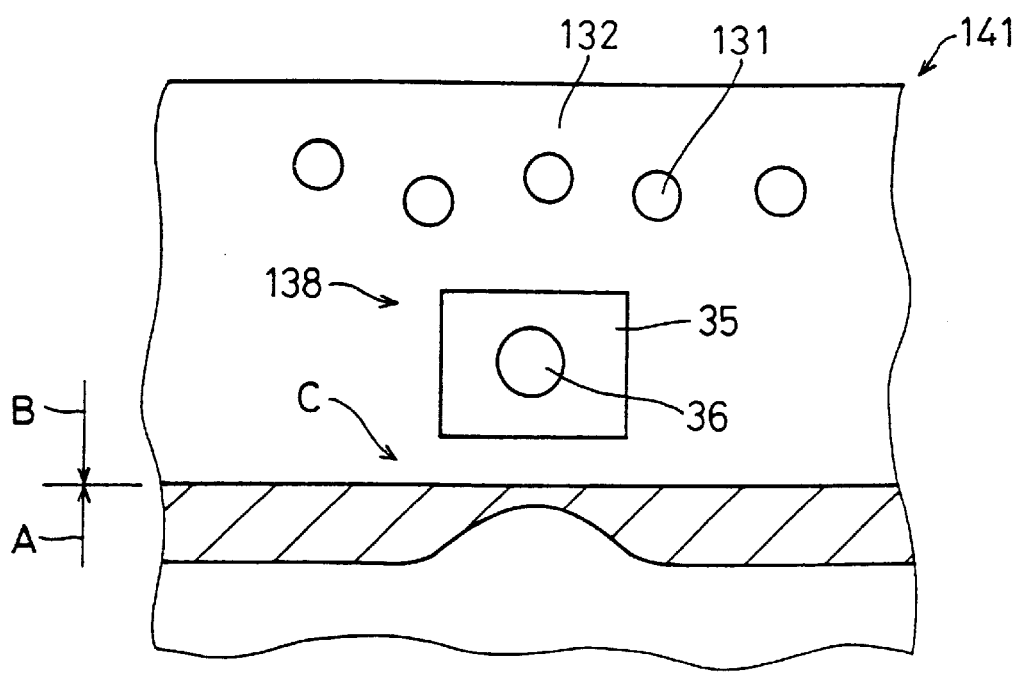
FIG. 6 is a plan view of a liquid crystal display apparatus 141 not having a second recess 137.
Figure 7:
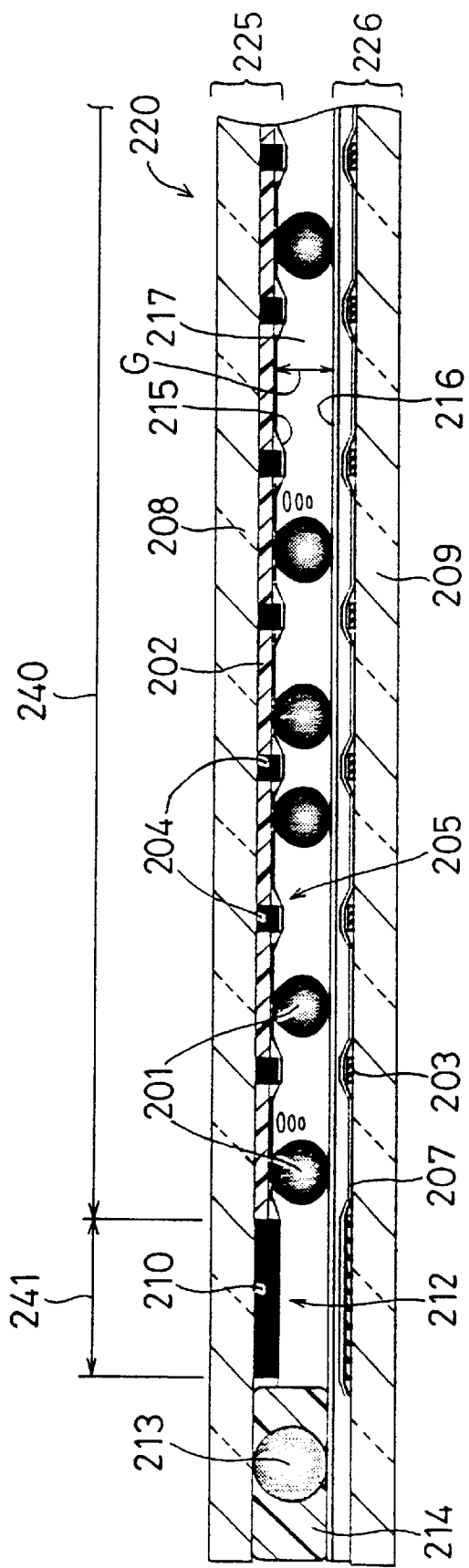
FIG. 7 is a section view showing the configuration of a liquid crystal display apparatus 220 of the prior art.

FIG. 6 is a plan view of a liquid crystal display apparatus 141 which is not provided with the second recess 137, and is used for clarifying features of the liquid crystal display apparatus 121c. In the contact hole 135 serving as a recess, restriction of the cell gap due to the spacers 130 and 131 are not exerted, and hence a region where the cell gap is small is locally formed in the picture frame region B. Depending on the quality of the material of the transferring agent 136, the transferring agent 136 itself may cause a region where the cell gap is small to be locally formed. Therefore, display unevenness C such as shown in FIG. 6 is caused in the display region A.

By contrast, in the liquid crystal display apparatus 121c of the invention, the second recess 137 is formed in the periphery of the contact hole 135 serving as a recess, and hence a region where the cell gap is small is not locally formed in the picture frame region B. Therefore, display unevenness C such as shown in FIG. 6 can be prevented from occurring.

Preferably, the second recess 137 is formed in the periphery of the contact hole 135 serving as a recess, and the diameter of the spacer 131 which is to be mixed into the liquid crystal sealing material 132 is optimized. According to this configuration, the uniformity of the cell gap can be further enhanced, and display unevenness caused by the cell gap difference between end and center portions of the display region A in the vicinity of the picture frame region B can be prevented from occurring.

As described above, in the liquid crystal display apparatuses 121a to 121c of the embodiments, the uniformity of the cell gap is improved and the display quality is improved. The recess 134 which can improve the uniformity of the cell gap can be formed only by changing a photomask, so that the improvements can be realized without increasing the production cost. Even when the surfaces of the substrates 151 and 152 are low in flatness, the uniformity of the cell gap can be maintained. Therefore, an overcoat layer for attaining flatness is basically unnecessary. Moreover, the cell gap can be further optimized by adjusting the area or formation position of the recess 134.

In order to uniformalize the cell gap, any one of the techniques of selecting the suitable thickness of the film for forming the recess 134, optimizing the area of the recess 134, and optimizing the position of the recess 134 may be employed, and the simplest technique can be freely selected. Even when it is impossible to perform a working on one of the substrates 151 and 152, the optimization can be coped with by the other of the substrates 152 and 151.

In the case where the color filter side substrate 151 has the black mask 124 made of a resin, the thickness of the black mask 124 in which the light transmittance is lowered in order to perform a black display must be increased. In this case, the thickness of the black mask 124 made of a resin is larger than that of the color filter 123, and the flatness of the surface of the color filter side substrate 151 is impaired, with the result that a uniform cell gap cannot be obtained. Even in such a case, the cell gap can be maintained uniform by forming the recess 134 in the TFT side substrate 152 which is opposed to the color filter side substrate 151.

Furthermore, also with respect to local display unevenness which is caused by a recess due to the contact hole 135 that is formed by any reason such as a common transfer portion, such local display unevenness can be suppressed by forming the second recess 137 in the vicinity of the recess.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for manufacturing a liquid crystal display apparatus in which spacers and a liquid crystal are interposed between a pair of substrates, the method comprising:

providing a protrusion in a liquid-crystal-facing surface of one of the substrates;

providing a recess for receiving at least one of the spacers in a region of a liquid-crystal-facing surface of the other of the substrates, the recess being opposed to the protrusion; and wherein a depth of the recess is greater than or equal to a distance which the protrusion extends above a surface adjacent thereto so that the spacer(s) in the recess does not adversely affect a cell gap of the liquid crystal display apparatus.

2. The method for manufacturing a liquid crystal display apparatus of claim 1, wherein the protrusion is a protrusion which is formed by a black mask.

3. A method for manufacturing a liquid crystal display apparatus in which spacers and a liquid crystal are interposed between a pair of substrates, the method comprising:

providing a recess in a liquid-crystal-facing surface of one of the substrates;

providing a protrusion in a portion of a liquid-crystal-facing surface of the other of the substrates, the protrusion being opposed to the recess; and wherein a depth of the recess is greater than a distance which the protrusion extends above a surface of an adjacent color filter so that the spacer(s) in the recess does not adversely affect a cell gap of the liquid crystal display apparatus.

4. A liquid crystal display apparatus comprising:

a pair of substrates;

spacers; and a liquid crystal, the spacers and liquid crystal being interposed between the pair of substrates, wherein a protrusion is formed in a liquid-crystal-facing surface of one of the substrates, and a recess for receiving spacer(s) is formed in a region of a liquid-crystal-facing surface of the other of the substrates, the recess being opposed to the protrusion;

wherein a depth of the recess is greater than a distance which the protrusion extends above a surface adjacent thereto so that spacer(s) in the recess does not adversely affect a cell gap of the liquid crystal display apparatus.

5. The liquid crystal display apparatus of claim 4, wherein the protrusion is a protrusion which is formed by a black mask.

6. The liquid crystal display apparatus of claim 4, wherein the depth of the recess is greater than a distance which the protrusion extends above a surface of an adjacent color filter so that the spacer(s) in the recess does not adversely affect the cell gap of the liquid crystal display apparatus.

7. A liquid crystal display apparatus comprising:

a pair of substrates;

spacers; and a liquid crystal, the spacers and liquid crystal being interposed between the pair of substrates, wherein a protrusion having a height H and a width W1 is formed in a liquid-crystal-layer-facing surface of one of the substrates, a recess having a depth D and a width W2 is formed in a region of a liquid-crystal-layer-facing surface of the other of the substrates, the region being opposed to the protrusion, and in the case where the height H of the protrusion is smaller than the depth D of the recess, the width W1 of the protrusion and the width W2 of the recess are selected so that the width W1 is larger than the width W2 of the recess.

8. The liquid crystal apparatus of claim 7, wherein the protrusion is a protrusion which is formed by a black mask.

9. The liquid crystal apparatus of claim 7, wherein the protrusion and recess are formed in a picture frame region in a periphery of a display region of the liquid crystal display apparatus.

10. The liquid crystal apparatus of claim 9, wherein the protrusion and recess are formed in a region in a picture frame region and separated from a display region.

11. The liquid crystal apparatus of claim 9, wherein the protrusion and recess are formed in a region in a picture frame region and in close proximity to a display region.

12. The liquid crystal apparatus of claim 9, wherein a second recess is further formed in a periphery of the recess of the other substrate.

* * * * *